United States Patent [19]

Weikert

[11] 4,021,283

[45] May 3, 1977

[54] METHOD OF MAKING ASEPTIC PACKAGING

[76] Inventor: Roy J. Weikert, c/o General Films, Inc., 2000 Schlater Drive, Sidney, Ohio 45365

[22] Filed: June 2, 1975

[21] Appl. No.: 582,866

Related U.S. Application Data

[60] Continuation-in-part of Ser. No. 436,104, Jan. 24, 1974, Pat. No. 3,941,306, which is a division of Ser. No. 256,769, June 23, 1972, Pat. No. 3,813,845.

[52] U.S. Cl. ............................... 156/244; 53/22 A; 53/22 B; 53/29; 53/183; 53/191; 229/53; 229/69
[51] Int. Cl.² ........................................ B65D 27/10
[58] Field of Search ............... 156/244, 500; 53/7, 53/11, 22 B, 22 R, 22 A, 26, 29, 35, 36, 37, 39, 40, 79, 112 R, 112 A, 112 B, 177, 180, 185, 186, 183, 191, 192; 229/53, 69, 93

[56] References Cited

UNITED STATES PATENTS

| 2,649,671 | 8/1953 | Bartelt ............................ 53/22 A |
| 3,079,292 | 2/1963 | Garth ............................... 229/53 |
| 3,206,908 | 9/1965 | Bodet .............................. 53/22 B |
| 3,559,874 | 2/1971 | Titchenal ......................... 229/69 |
| 3,618,286 | 11/1971 | Membrino ....................... 229/53 |
| 3,728,839 | 4/1973 | Glick .............................. 53/22 B |

Primary Examiner—Caleb Weston
Attorney, Agent, or Firm—Biebel, French & Nauman

[57] ABSTRACT

Aseptic packages are manufactured through a process which includes making an aseptic web of bags by first blow-extruding a continuous, closed thermoplastic tube using a noncontaminating gas, dividing the tube by means of partial, transverse heat seals into a series of interconnected bags intercommunicating with each other in a closed system by means of a continuous channel running across their open mouths and then, while maintaining the closed and hence, sterile condition of the web of bags, filling the bags with a sterile product and sealing the bags, to produce sealed, aseptic packages.

11 Claims, 4 Drawing Figures

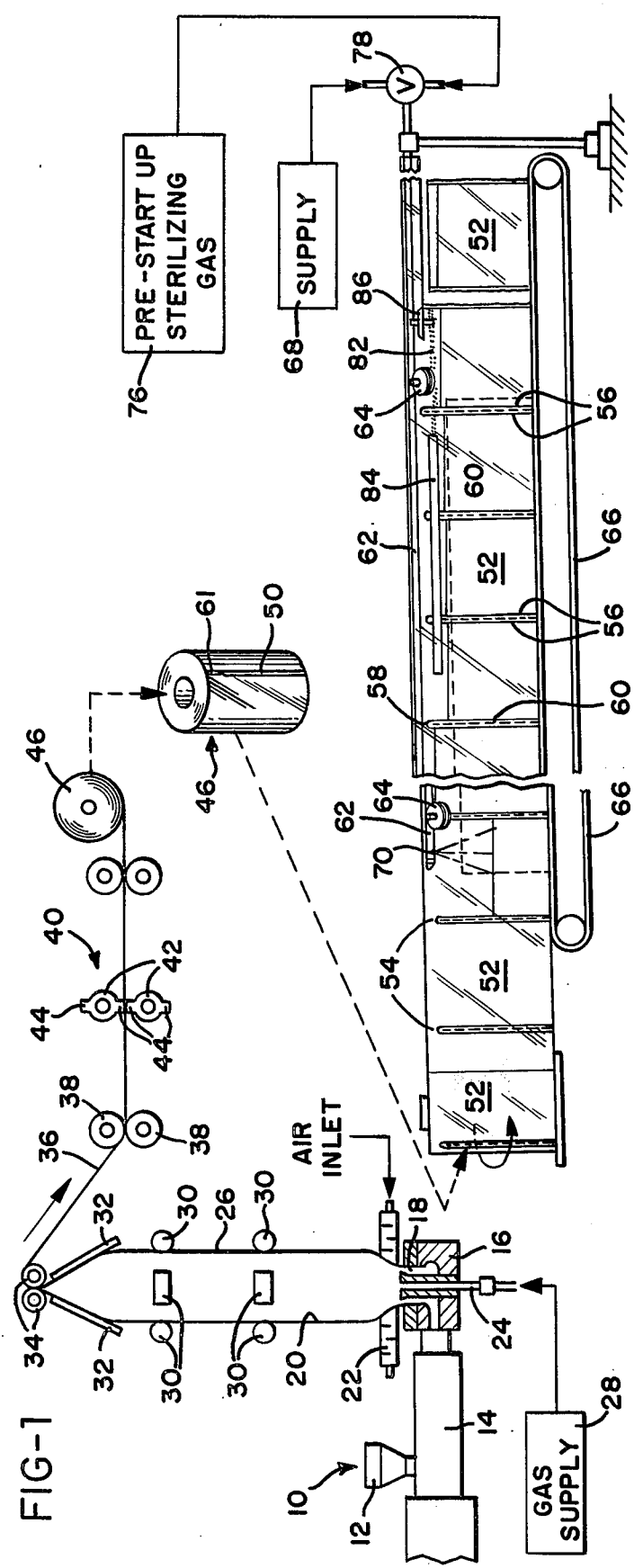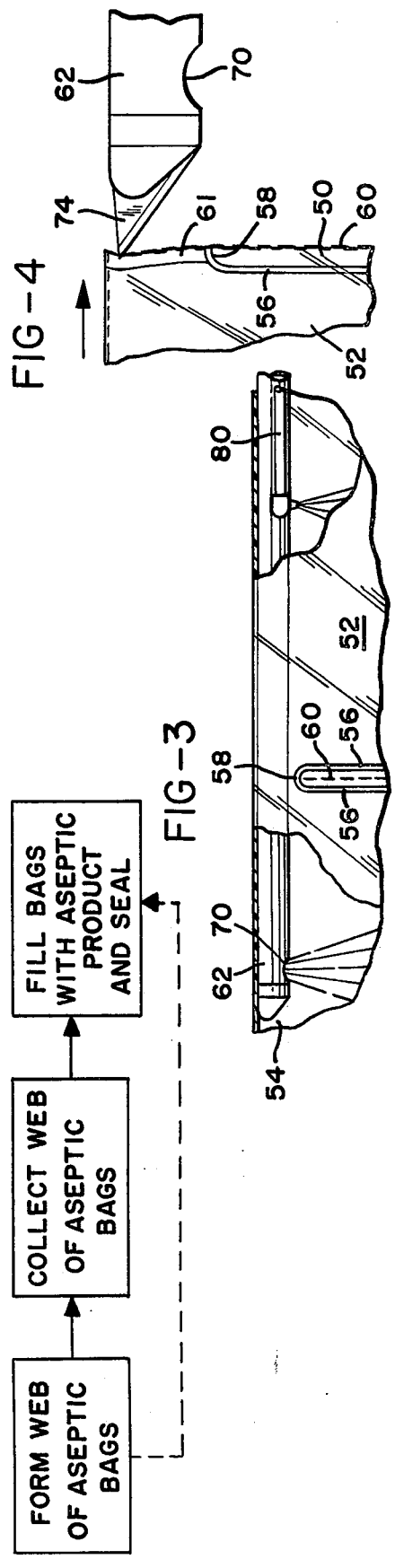

METHOD OF MAKING ASEPTIC PACKAGING

CROSS-REFERENCE TO RELATED APPLICATIONS

This application is a continuation-in-part of U.S. application Ser. No. 436,104, filed Jan. 24, 1974, U.S. Pat. No. 3,941,306, which is a division of U.S. application Ser. No. 256,769, filed June 23, 1972, now U.S. Pat. No. 3,813,845.

BACKGROUND OF THE INVENTION

Several patents have issued in recent years on machines for making, filling and sealing containers on a high volume basis. In the specific field of bag packaging, U.S. Pat. Nos. 2,877,609; 2,923,111; 3,269,278; 3,381,446; 3,462,913; 3,492,783; 3,559,874; and 3,791,573 are typical of patents disclosing machines and methods for filling and sealing bags on a high volume basis.

In each of the above noted patents a web of flexible packaging material, commonly a thermoplastic material, is folded longitudinally and provided with spaced, transverse sealing lines, typically heat seal lines, to divide the web into a series of interconnected compartments which are thereafter filled with the desired product and their open mouths sealed, again usually by means of a heat seal.

In some of these disclosures, for example, U.S. Pat. No. 3,492,783, the transverse seal lines extend from the bottom edge to a point short of the top edge to provide a pair of continuous free edges, apparently to permit the upper edges to be spread by a plow-like member to facilitate inserting of a filling nozzle into each of the compartments.

In others, such as U.S. Pat. Nos. 3,559,874 and 3,791,573, the tube is split after the transverse heat seals are formed to provide a pair of free edges which are spread open, similarly to the approach in U.S. Pat. No. 3,492,783, to allow filling.

While each of the systems disclosed in the above noted patents would appear to offer advantages over a manual packaging operation, it will be apparent that no attempt is made in such systems to form an aseptic package, that is one that is free of pathogenic microorganisms. Thus, when a product such as milk is packaged in systems of this type, it is essential that it be refrigerated in order to provide any appreciable shelf life. It will be appreciated, however, that in many countries refrigeration is a rarity and, as a consequence milk, a high protein food, is generally unavailable.

In applicant's above noted U.S. Pat. No. 3,813,845 an attempt is made to provide sterile packages by providing multiple pipes at the filling section of the filling and sealing machine disclosed therein and injecting into the web of bags through one of the multiple pipes a sterilizing gas which is thereafter displaced by the product deposited in the bags by one or more of the multiple pipes.

SUMMARY OF THE INVENTION

In accordance with the present invention an aseptic package is produced by forming a web of bags which is free of pathogenic microorganisms and thereafter filling the bags with a sterile product and sealing the bags, all without opening the bags to ambient air and thereby destroying their sterile interiors.

This is accomplished by blow-extruding the web of bags with a gas which is noncontaminating. The term "noncontaminating" as used herein has two connotations. Ordinarily the temperatures at which the tube material is extruded, say 300° to 500° F, are such that the heat kills all pathogenic microorganisms and it is only necessary to insure that the gas which is blown through the extruder to form the bubble is also sterile in the sense that it does not contain any pathogenic microorganisms which would contaminate the tube which had been sterilized by the heat of extrusion. Sterile air could be used although in some instances, a gas which is substantially inert as well as sterile, such as nitrogen, may be desirable. In a second sense the term "noncontaminating" is used to indicate a gas which in itself is capable of killing any pathogenic microorganisms. Examples of gases of this type suitable for sterilization are propylene oxide and ethylene oxide.

The bubble of noncontaminating gas, that is, a gas either free of pathogenic microorganisms or a gas capable of killing pathogenic microorganisms, maintains the walls of the tube out of contact with each other until the tubing material, typically polyethylene or polypropylene, has cooled to the pont where the tube can be collapsed without the walls adhering to each other. Usually the collapsed tube will then be fed in-line to a heat seal station where partial transverse heat seals are formed in the tube, although the web could be collected in roll or other form and passed through a heat seal station at a later time.

As a practical matter it will generally be preferable to form the partial transverse seals in-line, since it is a relatively simple matter to extend the transverse seals at the beginning and end of a roll so that they extend completely across the tube, sealing its interior and preserving its sterility.

In either case, the partial, transverse seals formed extend from one longitudinal edge of the flattened tube to a point short of the opposite longitudinal edge. Preferably the heat seals are of substantially U-shaped configuration with the two legs of the U extending in spaced parallel relationship to each other and interconnected adjacent one end by a bight portion. If desired, lines of serrations or the like can be formed between the spaced parallel legs extending from one longitudinal edge of the tube toward but not beyond the bight portion interconnecting the legs.

With this construction a completely closed system of interconnected bags is formed intercommunicating with each other by means of a continuous closed channel running across the open mouths of the bags.

Where filling and sealing is done on an exceptionally high volume basis, it may be practical to lead the web of bags directly from the heat sealing station to a filling and sealing machine. However in most applications, the web of bags with the partial, transverse heat seals will be collected in roll or other convenient form and shipped, after appropriate packaging, to a filling and sealing installation.

A filling and sealing machine similar in many respects to that disclosed in applicant's U.S. Pat. No. 3,813,845 is particularly adapted for practicing the process of the present invention. This machine includes an elongated filling pipe which is inserted into the interconnecting channel extending across the open mouths of the bags. The product being packaged, which has been rendered aseptic itself, is then conveyed through the filling nozzle and into the bags. It will be seen, therefore, that the bags are rendered aseptic during their production and can be maintained aseptic without providing spcial clean rooms or the like because the system of bags need not be opened to fill and seal the bags.

In commencing the filling and sealing operations it may be desirable to first treat the filling pipe with a germicide or the like prior to introducing the filling pipe into the channel extending across the open mouths of the bags. Additionally, as noted above, it will usually be desirable to seal both ends of the tube to preserve its sterility. Tofacilitate start-up of the filling and sealing operation, the filling pipe may be provided with a sharpened end which can pierce the sealed end of the tube during initial threading of the web onto the filling pipe.

In some cases it may be possible to dispense with sealing the ends of the tube since the tightly wrapped bundle of interconnected bags, as in roll form, will have all but the end bag or two maintained in a sterile condition. This is particularly true where the bags are extruded using a noncontaminating gas which is also germicidal, such as propylene oxide and ethylene oxide, since some residual gas will remain in the tube after packaging and will tend to seep out through the end bag or bags and maintain them in aseptic condition. Additionally, at start-up several bags, which are relatively inexpensive, can be run through the filling and sealing machine without being filled and then discarded to insure that the end bag or bags which may be contaminated are not actually filled and sealed.

A further alternative which may be utilized at start-up is to admit a sterilizing gas through the filling pipe a sufficient length of time to sterilize the inside and outside of the filling pipe and the initial length of tubing which has been applied to the filling pipe. Thereafter the sterilizing gas is turned off and the product is conveyed through the filling pipe as in the normal filling and sealing operation.

As a further precaution an auxiliary noncontaminating gas line of relatively small diameter may be installed adjacent the filling pipe and a very small volume of noncontaminating gas admitted to slightly pressurize the system of unrolled bags, or at least develop an exhaust of the gas in order to avoid any possible breathing of contaminated atmospheric air into the system during operation. Gas injected in this manner will pass off through the offal tubing removed following final sealing of the bags.

It will be appreciated that several of the steps mentioned above for preserving the sterility of the tube during shipping and/or filling of the bags may be combined. For example, the ends of the tube could be sealed, the filling pipe flushed with a germicidal gas prior to filling and a small auxiliary gas line operated during filling.

After the bags have been filled as they are fed along the filling pipe, a continuous, longitudinally extending seal is formed which intersects the parallel legs of the partial, transverse seals beneath the interconnecting bight portions of the trasverse seals, and a continuous longitudinal cut is made above the continuous longitudinally extending seal, separating the bags from the channel extending across the bags, and freeing the filled, sealed bags from the filling pipe.

From the above it will be seen that sterile packages on a high volume basis are produced by forming a sterile web of interconnected bags which intercommunicate in a completely closed system of a continuous channel extending across the open mouths of the bags. The bags are thereafter filled with a sterile product and sealed without opening the closed system of bags, thereby preserving their aspectic quality and provide filled, aseptic packages.

BRIEF DESCRIPTION OF THE DRAWINGS

FIG. 1 is a somewhat schematic representation showing steps of the process of the present invention;

FIG. 2 is a block diagram illustrating alternate modes of practicing the present invention;

FIG. 3 is an enlarged view, partly in section, showing a step of the present invention; and FIG. 4 is a view illustrating a modification of the present invention.

DESCRIPTION OF THE PREFERRED EMBODIMENTS

As seen in FIG. 1 of the drawings, an extruder 10 includes a supply hopper 12 for feeding a synthetic, resinous thermoplastic packaging material such as polyethylene, polypropylene or the like into a plasticizing section 14 wherein the material becomes molten and extrudable, generally in the range of about 300° to 500° F.

The molten material is then conveyed to a die 16 having an annular orifice 18 through which the extrudant is ejected to form a tube 20. A cooling ring 22 supplies cooling air to the exterior of the tube 20 and a line 24 supplies a gas to the interior of the tube 20 to form the bubble 26.

In accordance with the present invention the gas conveyed through the pipe 24 from a supply 28 is a noncontaminating gas. Thus, in addition to its function of maintaining the walls of the tube apart from each other until the material has solidified sufficiently to prevent sticking, the gas is selected such that it either contains no pathogenic microorganisms to contaminate the interior of the tube 20 which has been sterilized by reason of the heat present, or the gas may in itself be germicidal in that it is capable of killing any microorganisms with which it comes into contact.

In either case, the tube is directed upwardly by guide rollers 30 between a pair of collapsing frames 32 and thence between pinch rollers 34 to form a flattened web 36. Web 36 is then directed by rollers 38 to a heat seal station 40 which may consist of an opposed pair of rollers 42, each carrying a pair of heated platens 44 to provide a series of transverse seal lines in the web 36. The web may then be collected in roll form 46 and packaged and shipped to a filling and sealing site.

As can be seen in FIG. 1, the transverse seal lines 50 formed at the station 40 extend from one longitudinally extending edge of the web 36 to a point adjacent to, but spaced from the opposite, longitudinally extending edge of the web. This results in a substantially closed system of interconnected bags 52 intercommunicating with each other by means of a channel 54 extending along one longitudinal edge of the web across the open mouths of the bags 52.

It will also be noted from FIG. 1 of the drawings, and also to some extent from FIG. 3, that each of the partial, transverse seal lines 50 includes a pair of spaced, parallel legs 56 interconnected adjacent one of their ends by a bight portion 58 while a line of serrations or the like 60 extends between the spaced parallel legs 56 toward but not beyond the bight portion 58.

As noted above, it will usually be desirable to seal the leading and trailing ends of each roll to preserve the sterility of the interior of the tube. This can be done conveniently at the transverse heat seal station by simply providing an additional, fairly wide seal extending from the bight portion 58 of the transverse heat seal at the leading and trailing ends of the roll to the adjacent longitudinal edge of the tube, as indicated at 61 in FIG. 1 of the drawings. The trailing end of one roll can then be separated from the leading end of the next roll along the line of serrations 60 and then by cutting the tube through the wide seal 61 from the bight portion 58 to the adjacent longitudinal edge of the tube.

Upon receipt of the roll of bags 46 at the filling and sealing station, the filling pipe 62 of the filling and sealing machine is inserted in the channel 54, after breaking the seal and the web is drawn up, manually for example, along the pipe 62.

Although the web can be supported by the filling pipe and opposed pairs of rollers 64 bearing on the pipe through the web on opposite sides of the pipe (only one roller of each pair being shown in FIG. 1) it will usually be desirable to provide at least a bottom conveyor 66 and side conveyors, if desired, all as more fully shown in Applicant's prior U.S. Pat. No. 3,813,845.

As described above, it will be seen that the aseptic web of bags is first collected in some convenient form such as rolls and shipped to some distant point for filling and sealing with an aseptic product.

It will be apparent, however, as indicated by the broken line in FIG. 2, that the step of collecting the bags following formation thereof may be eliminated and the aseptic tube fed directly to the filling and sealing machine instead. This mode of operation would find particular use in high volume packaging, while the embodiment shown in FIG. 1 would generally be more practical for smaller installations.

In any case, an aseptic product from a supply 68 thereof flows through the filling pipe 62 and is discharged at 70 into a bag 52. Various types of metering systems can be used during the filling operation to insure that the desired quantity of product is deposited in each of the bags 52, such as the systems desribed in applicant's above noted patent.

Where, in order to preserve the sterile condition of the web of bags, the leading and trailing ends of the web are sealed, the filling pipe 62, FIG. 4, may be provided with a sharpened attachment 74 for piercing the seal 61 at the leading end of the web. Additionally, the filling pipe may be treated with a germicidal compound prior to its insertion into the channel 54 to kill any microorganisms on the filling pipe.

To enhance further the sterility of the operation, a supply 76 of prestart-up sterilizing gas can be utilized feeding through a three-way valve 78 into the filling pipe 62. With this approach the valve 78 is first positioned to close off the supply 68 of aspectic filling material and allow the supply of prestart-up sterilizing gas, to enter the pipe 62 and discharge through the outlet 70, filling the unrolled bags 52 and sterilizing them as well as the channel 54 and the pipe 62 received in the channel 54. After a sufficient period of time has elapsed to insure sterilization, the valve 78 can be repositioned, cutting off the sterilizing gas and connecting the supply 68 to the filling pipe 62.

An additional operation which may be used in place of or in conjunction with either of the embodiments described above is the use, as seen in FIG. 3, of a small auxiliary gas line 80 which ejects a supply of noncontaminating gas through the nozzle, not to sterilize the interior of the tube but to maintain a slight positive pressure or a discharge of noncontaminating gas from the tube to prevent ambient air from being breathed into and contaminating the substantially closed system of bags. Gas pumped into the web in this manner will be exhausted through the offal tubing during the separation step described below.

Following filling of the bags 52 with an aspectic product a continuous, longitudinally extending heat seal line 82 is formed in the web by means of band sealers or the like 84 inersecting the partial transverse seal lines 50 and thereby completely sealing the aseptic product within the bags 52.

Filling of the bags will often result in their separating from each other along the lines of serrations 60 as they expand, so that when the web is cut, as by the cutter 86 along a line extending above the seal line 82 but intersecting the transverse seal lines 50, the bags 52 are separated from each other as seen at the right hand end of FIG. 1 of the drawings.

From the above it will be seen that the present invention provides a system of producing aseptic packages in which the uncontaminated quality of the web of bags is preserved during the filling and sealing operation by virtue of the fact that the system remains substantially closed under controlled sterile conditions during the filling and sealing operation.

While the methods herein described constitute preferred embodiments of the invention, it is to be understood that the invention is not limited to these precise methods and that changes may be made in either without departing from the scope of the invention.

What is claimed is:

1. A method of making aseptic packages comprising:
   a. extruding a molten thermoplastic resin through a tube-forming die thereby forming a continuous, closed tubing of extrudant,
   b. forming a bubble at said die by blowing a noncontaminating gas into said tubing of extrudant thereby producing tubing having a sterile interior,
   c. after said tubing has solidified to a nonmolten state, collapsing said tubing into flattened web thereof,
   d. forming a series of longitudinally spaced seal lines extending from one longitudinally extending edge of said flattened web of tubing to a point adjacent to but spaced from an opposite longitudinally extending edge thereof while maintaining a substantially sterile condition within said tubing,
   e. said transversely extending seal lines thereby defining a series of interconnected, sterile bags and a continuous, sterile channel extending along said opposite longitudinally extending edge of said web of tubing forming a completely closed sterile system of interconnected bags communicating with each other in said closed system by means of said sterile channel,
   f. inserting a hollow filling tube into said channel without slitting said channel open lengthwise thereof,
   g. filling said bags through said filling tube with an aseptic product within a controlled, sterile environment, and
   h. sealing said bags along a line disposed beneath said channel.

2. The method of claim 1 further comprising:

a. collecting said web of bags in roll form.
3. The method of claim 1 further comprising:
a. sealing the leading end of said web of bags, and
b. sealing the trailing end of said web of bags following completion of the formation thereof.
4. The method of claim 1 wherein:
a. said step of extruding said molten thermoplastic resin includes extruding said resin at a temperature between 300° to 500° F.
5. The method of claim 4 wherein:
a. said step of blowing a noncontaminating gas into said tube comprises blowing a sterilized gas into said tube.
6. The method of claim 5 wherein:
a. said step of blowing a noncontaminating gas into said tube comprises blowing nitrogen into said tube.
7. The method of claim 1 wherein:
a. said step of blowing of noncontaminating gas into said tube comprises blowing a germicidal gas into said tube.
8. The method of claim 7 wherein:
a. said step of blowing a germicidal gas into said tube comprises blowing a gas selected from a group consisting of ethylene oxide and propylene oxide into said tube.
9. The method of claim 1 further comprising:
a. prior to filling said bags through said filling tube, flushing said filling tube and that portion of said web of bags supported thereby with a germicidal gas.
10. The method of claim 9 further comprising:
a. admitting a flow of noncontaminating gas into that portion of said web of bags received on said filling tube during said filling of said bags.
11. A method of forming aseptic packages comprising:
a. extruding in molten form through an annular die a thermoplastic material to thereby form a tube of extruded material downstream of said die,
b. blowing into said tube a noncontaminating gas,
c. after said tube has cooled from molten to solid form, collapsing said tube into a flattened configuration,
d. dividing said tube by means of a series of transverse seal lines extending partially across said flattened tube from one longitudinal edge thereof toward an opposite longitudinal edge thereof into a series of interconnected bags intercommunicating in a substantially closed system by means of a channel extending longitudinally along said opposite longitudinal edge of said tube,
e. inserting a filling pipe into said channel without slitting said channel open lengthwise thereof and discharging through said filling pipe an aseptic product into said bags under controlled sterile conditions,
f. sealing said bags with said aseptic filling material therein along a longitudinally extending line intersecting said transverse seal lines, and
g. severing said tube longitudinally thereof intermediate said longitudinally extending seal line and the adjacent longitudinal edge of said tube.

* * * * *